United States Patent [19]

Rohde

[11] Patent Number: 4,962,802

[45] Date of Patent: Oct. 16, 1990

[54] PNEUMATIC VEHICLE TIRE

[75] Inventor: Dieter Rohde, Lehrte, Fed. Rep. of Germany

[73] Assignee: Continental Aktiengesellschaft, Hanover, Fed. Rep. of Germany

[21] Appl. No.: 303,509

[22] Filed: Jan. 27, 1989

[30] Foreign Application Priority Data

Jan. 28, 1988 [DE] Fed. Rep. of Germany ....... 3802503

[51] Int. Cl.$^5$ ............................ B60C 9/00; B60C 1/00
[52] U.S. Cl. .................................. 152/532; 152/537; 152/209 NT
[58] Field of Search ........ 152/532, 537, 538, 209 NT, 152/209 R

[56] References Cited

U.S. PATENT DOCUMENTS

| | | | |
|---|---|---|---|
| 3,976,115 | 8/1976 | Mirtain et al. | 152/532 |
| 3,982,579 | 9/1976 | Mirtain | 152/532 X |
| 4,062,393 | 12/1977 | Bertrand | 152/532 |
| 4,425,953 | 1/1984 | Rohde et al. | 152/532 |

FOREIGN PATENT DOCUMENTS

| | | | |
|---|---|---|---|
| 0122530 | 10/1984 | European Pat. Off. | 152/538 |
| 1007644 | 5/1957 | Fed. Rep. of Germany. | |
| 1245778 | 7/1967 | Fed. Rep. of Germany | 152/532 |
| 3439103 | 5/1986 | Fed. Rep. of Germany | 152/538 |

Primary Examiner—Michael W. Ball
Assistant Examiner—Gregory J. Wilber
Attorney, Agent, or Firm—Robert W. Becker & Associates

[57] ABSTRACT

A pneumatic vehicle tire having a radial carcass, the load-carriers of which are made of steel or of a material of comparable high strength, and the ends of which are anchored in the tire beads by being looped around pull-resistant bead cores. The tire has a centrally disposed tread strip with a recessed portion on each side, and a multi-ply belt, which to the sides extends into the recessed portions, and which has load-carriers made of steel or the like. A low-damping rubber layer can be disposed between plies of the belt. In order to achieve a further reduction of resistance to rolling, it is proposed to dispose a rubber layer, of soft, low-damping rubber, between the radially innermost ply of the belt and the radial carcass, with this rubber layer having a Shore A hardness in a range of from 50 to 65, and a rebound elasticity in a range of from 55 to 70%.

4 Claims, 1 Drawing Sheet

PNEUMATIC VEHICLE TIRE

BACKGROUND OF THE INVENTION

The present invention relates to a pneumatic vehicle tire, especially for commercial vehicles, having a radial carcass, the load-carriers of which are made of steel or of a material of comparable high strength, and the ends of which are anchored in the tire beads by being looped around pull-resistant bead cores. The tire has a centrally disposed tread strip that has a recessed portion on each side. The tire also has a multi-ply belt, which to the sides extends into the recessed portions, and which has load-carriers made of steel or of a material of comparable high strength. A low-damping rubber layer can be disposed between plies of the belt.

A tire of this general type without a low-damping rubber layer between plies of the belt is disclosed, for example, in German Offenlegungsschrift 33 13 535Rohde corresponding to co-pending U.S. Pat. application Ser. No. 233,834-Rohde filed Aug. 16, 1988, belonging to the assignee of the present invention, and with such a low-damping rubber layer in German Offenlegungsschrift 34 30 501 Rohde et al corresponding to U.S. Pat. No. 4,671,333-Rohde et al dated June 9, 1987, belonging to the assignee of the present invention. Such tires have given best results when used with commercial vehicles. By providing a step in the shoulder region, and by having the belt plies extend laterally into the stepped portions, as well as by possibly introducing a low-damping rubber layer between plies of the belt, a tire having a reduced resistance to rolling was provided with which considerable savings in fuel could be obtained. The reduced resistance to rolling was primarily achieved by reducing the build up of heat due to unavoidable deformations of the tread strip zone during driving operation. The rubber cushions, which in the shoulder region shift in a wedge-like manner between the ends of the belt and the carcass, effect in this region a balancing-out between the stiff belt ply unit and the more flexible carcass.

German Auslegeschrift 10 07 644 Fletcher dated May 2, 1957 discloses a vehicle tire, especially for aircraft, where radially outwardly from an eight-ply diagonal carcass of textile fabric there is disposed a belt of steel cord fabric, with a resilient rubber underlayer of a carcass rubber mixture being disposed between them. The belt plies extend at an angle of 45° relative to the circumferential direction of the tire. The rubber underlayer serves to prevent a detachment of the belt from the carcass due to the overall rigidity of the tire and the relative movement between the tread strip and the carcass resulting therefrom. This known rubber underlayer is at least 2 to 5 mm thick.

It is an object of the present invention with a pneumatic vehicle tire of the aforementioned general type, to further reduce the build up of heat in the area of the tread strip without the remaining driving properties suffering thereby.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
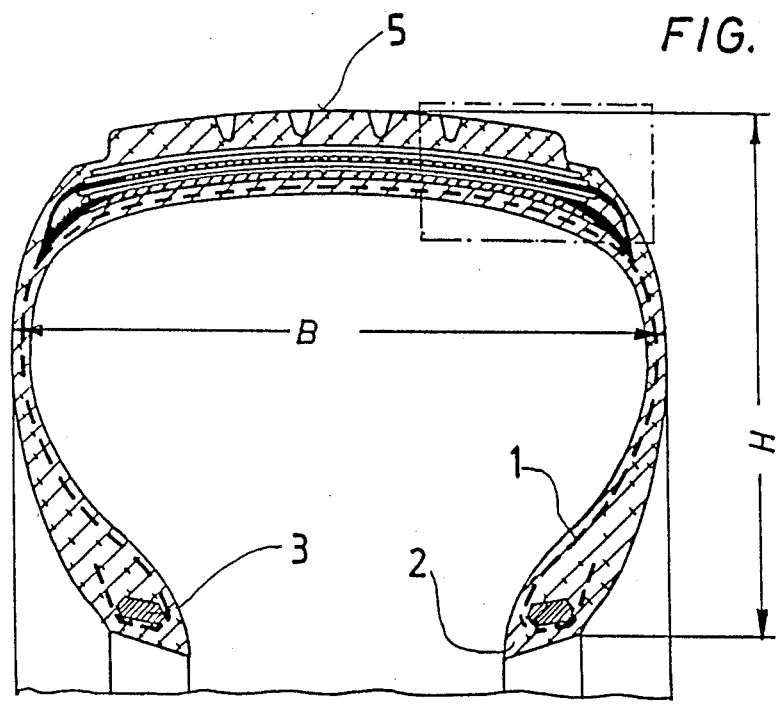
FIG. 1 is a partial radial cross-sectional view through one exemplary embodiment of the inventive pneumatic vehicle tire, for larger commercial vehicles.
Figure 2:
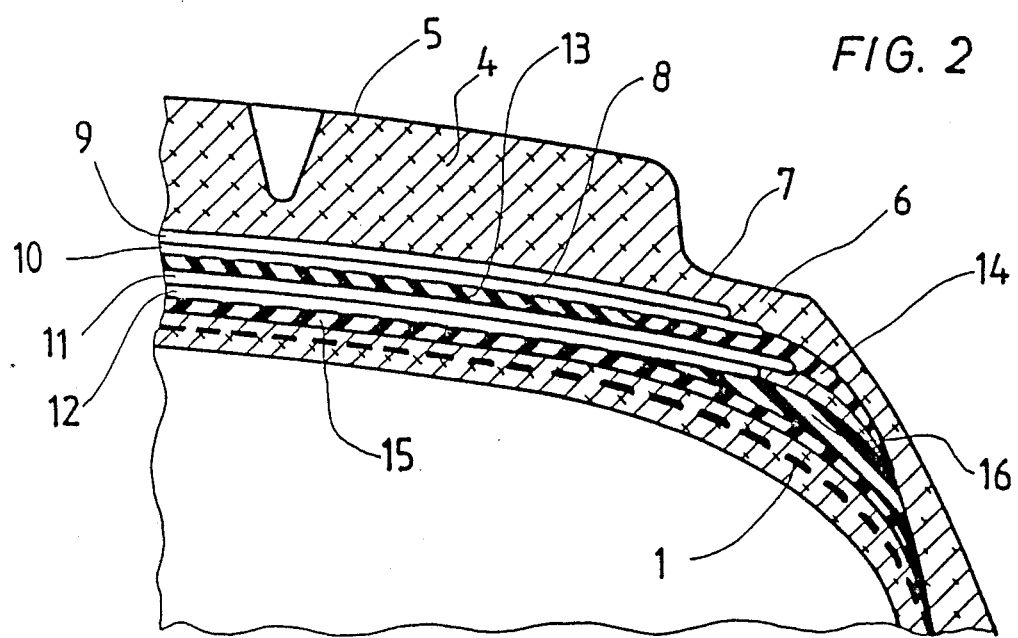
FIG. 2 is an enlarged partial cross-sectional view through a portion of the tire of FIG. 1.

The pneumatic vehicle tire of the present invention is characterized primarily by a rubber layer, of soft, low-damping rubber, that is disposed between the radially innermost ply of the belt and the radial carcass, with this rubber layer having a Shore A hardness in a range of from 50 to 65, and a rebound elasticity in a range of from 55 to 70%.

Pursuant to the present invention, it is possible to further reduce the resistance to rolling of a pneumatic vehicle tire for commercial vehicles. BY distributing the low-damping rubber layers into two areas of the tread strip region, the advantage of a high overall effect is achieved without too great of a difference occurring at a single location between the stiff structure of the belt unit and the more flexible steel cord carcass.

Further specific features of the present invention will be described in detail subsequently.

DESCRIPTION OF PREFERRED EMBODIMENTS

Referring now to the drawing in detail, the tire body essentially comprises rubber or rubber-like synthetic materials. The tire body is stabilized by reinforcing inserts that are securely connected to the rubber or the like via vulcanization The tire body has a radial carcass 1, the ends of which are anchored in the tire beads 2 by being looped around pull-resistant bead cores 3. The tread strip 4 is delimited toward the outside by the tread surface 5, and toward the sides by two recessed portions 6, the outer surfaces 7 of which do not come into contact with the roadway under normal conditions. Disposed between the tread strip 4 and the radial carcass 1 is a belt 8 that is pull-resistant in the circumferential direction. The belt 8 comprises four superimposed cord fabric plies 9, 10, 11 and 12, the load-carriers of which are made of steel wires or cables, or of a material of similar high strength, such as Kevlar; in each of the plies 9, 10, 11 and 12, the load-carriers extend parallel to one another. The two upper plies 9, 10 on the one hand and the two lower plies 11, 12 on the other hand preferably respectively form symmetrical cross bandings, with the load-carriers thereof forming the customary angle, relative to the circumferential direction of the tire, for belt constructions. To the side the belt plies 9 to 12 extend into the side portions 6. Disposed between the radially outer pair of plies 9, 10 on the one hand, and the radially inner pair of plies 11, 12 on the other hand, is a rubber layer that is formed from a central strip 13 and two side strips 14. Approximately half of the width of each side strip 14 extends into the space between the two aforementioned pairs of belt plies, while the other half of each side strip 14 extends out into the shoulder region in a substantially wedge-shaped manner and essentially parallel to the radial carcass 1. The central strip 13 has a Shore A hardness in a range of between 40 and 50, with this hardness preferably being 48. In contrast, the Shore A hardness of the side strips 14 is in a range of 58 to 80, and is preferably in a range of 65 to 70. In addition, the central strip 13 is made of rubber having a rebound elasticity in a range of 60 to 70% (as measured according to DIN (German Industrial Standard) 53512), while the rebound elasticity of the rubber of the side strips 14 is in a range of 40 to 50%. The central strip 13 can have a thickness in a range of 2 to 4 mm.

Disposed between the radially inner pair of plies 11, 12 of the belt 8 and the radial carcass 1 is a further rubber layer 15, which is a soft, low-damping rubber layer, that extends to the sides beyond the belt plies where it is covered by respective shoulder cushions 16 that have essentially the same rubber quality. The shoulder cushions 16 in turn extend to approximately half of their width into the space between the belt 8 and the radial carcass 1, i.e. the rubber layer 15, and beyond this space are curved radially inwardly in order to provide a harmonic transition to the carcass curve in this region. The rubber layer 15 is preferably no more than 2 mm thick, although for large tires it can be slightly thicker. The hardness of the rubber layer is in a range of 50 to 65 Shore A, and is preferably approximately 60. The rebound elasticitY of the rubber layer 15 is in a range of from 55 to 70%, and is preferably about 60%. The rubber layer 15 is preferably produced on a base of pure natural rubber.

The rubber layer 15 can be produced in a conventional manner by extrusion or calendering. To simplify build-up of the tire, the rubber layer 15 can already be combined with the shoulder cushions 16 to form a single unit via doubling. Since the shoulder cushion 16 can often have the same rubber quality as does the rubber layer 15, all three parts could be integrally produced pursuant to known processes.

The inventive tire construction described above is particularly suitable for tires for commercial vehicles, such as trucks and buses, where the tires have a relatively low height-to-width ratio, i.e. where the ratio of the height H of the tire to the width B of the tire is 0.8 and less. If necessary, the previously described construction can also be modified in such a way that the rubber layer 13 between the pairs of belt plies is eliminated.

The present invention is, of course, in no way restricted to the specific disclosure of the specification and drawing, but also encompasses any modifications within the scope of the appended claims.

What I claim is:

1. In a pneumatic vehicle tire having a radial carcass, the load-carriers of which are made of a material of high strength comparable to that of steel, and the ends of which are anchored in the tire beads by being looped around pull-resistant bead cores, with said tire having a centrally disposed tread strip that has recessed portions respectively on each tread side, and with said tire also having a multi-ply belt, said belt relative to the tread sides respectively extending into the said recessed portions, and which has load-carriers made of a material of high strength comparable to that of steel, the improvement in combination therewith comprising:

a first rubber layer, of soft, low-damping rubber, that disposed between said radial carcass and the radially innermost one of said plies of said belt and that extends continuously between opposite belt edges as well as to the sides of the tire beyond the belt plies, with said rubber layer having a Shore A hardness of from 50 to 65, and furthermore having a rebound elasticity specifically in a range of between 55 and 70%; and a second low-damping rubber layer that is disposed between plies of said belt; said first rubber layer, over its entire axial extension, having a thickness of up to 2 mm.

2. A pneumatic vehicle tire in combination according to claim 1, in which said first rubber layer has a Shore A hardness of approximately 60.

3. A pneumatic vehicle tire in combination according to claim 2, in which said first rubber layer has a rebound elasticity of about 60%.

4. A pneumatic vehicle tire in combination according to claim 3, in which said first rubber layer is produced from pure natural rubber.

* * * * *